US012624804B2

(12) United States Patent
Sun et al.

(10) Patent No.: US 12,624,804 B2
(45) Date of Patent: May 12, 2026

(54) DEVICE FOR REAL-TIME DETECTION OF PIPELINE GAS LEAKAGE AND LEAKAGE PREVENTION, AND USE METHOD

(71) Applicants: ANHUI UNIVERSITY OF SCIENCE AND TECHNOLOGY, Huainan City (CN); CHINA COAL TECHNOLOGY & ENGINEERING GROUP SHENYANG ENGINEERING COMPANY, Shenyang (CN); CHINA UNIVERSITY OF MINING AND TECHNOLOGY, Xuzhou (CN)

(72) Inventors: Zhenping Sun, Shenyang (CN); Xiao Liu, Shenyang (CN); Sheng Xue, Huainan City (CN); Yingji Fang, Shenyang (CN); Yanan Gao, Xuzhou (CN); Feng Dou, Shenyang (CN)

(73) Assignees: ANHUI UNIVERSITY OF SCIENCE AND TECHNOLOGY, Huainan City (CN); CHINA COAL TECHNOLOGY & ENGINEERING GROUP SHENYANG ENGINEERING COMPANY, Shenyang (CN); CHINA UNIVERSITY OF MINING AND TECHNOLOGY Xuzhou, Jiangsu (CN)

( * ) Notice: Subject to any disclaimer, the term of this patent is extended or adjusted under 35 U.S.C. 154(b) by 320 days.

(21) Appl. No.: 18/291,501

(22) PCT Filed: Jun. 21, 2023

(86) PCT No.: PCT/CN2023/101655
§ 371 (c)(1),
(2) Date: Jan. 23, 2024

(87) PCT Pub. No.: WO2024/229940
PCT Pub. Date: Nov. 14, 2024

(65) Prior Publication Data
US 2024/0402034 A1     Dec. 5, 2024

(51) Int. Cl.
*F17D 5/02* (2006.01)
*F16K 7/10* (2006.01)
(Continued)

(52) U.S. Cl.
CPC .................. *F17D 5/02* (2013.01); *F16K 7/10* (2013.01); *F17D 5/005* (2013.01); *G01M 3/04* (2013.01)

(58) Field of Classification Search
CPC .. F16K 7/10; F17D 5/02; F17D 5/005; G01M 3/04–246
See application file for complete search history.

(56) References Cited

U.S. PATENT DOCUMENTS 5,285,806 A * 2/1994 Ortega .................. F16L 55/124
                                                        137/15.08
2018/0238483 A1* 8/2018 Mainzer .............. F16L 55/1022

FOREIGN PATENT DOCUMENTS

CN          204533951 U     8/2015
CN          109827070 A     5/2019
(Continued)

OTHER PUBLICATIONS
Machine translation of KR 960006187 (Year: 1996).*

*Primary Examiner* — Nathaniel J Kolb
(74) *Attorney, Agent, or Firm* — Muncy, Geissler, Olds & Lowe, P.C.

(57) ABSTRACT
A device for real-time detection of pipeline gas leakage and leakage prevention includes a gas pipeline, wherein a gas detector is arranged at an outer part of the gas pipeline, a
(Continued)

telescopic cylinder is also electrically connected to an outer side of the gas detector, a plurality of three-way elliptical pipes are mounted at a middle segment part of the gas pipeline, a limiting cylinder is fixedly mounted at a bottom port of each three-way elliptical pipe, a separating mechanism is arranged between each limiting cylinder and the three-way elliptical pipe, and a pneumatic mechanism is arranged at a bottom of the limiting cylinder. After detecting gas leakage, the gas detector immediately triggers the telescopic cylinder through an electrical signal, and the pneumatic mechanism triggers the separating mechanism to separate and seal the three-way elliptical pipe when being driven by the telescopic cylinder.

5 Claims, 6 Drawing Sheets

(51) Int. Cl.
F17D 5/00 (2006.01)
G01M 3/04 (2006.01)

(56) References Cited

FOREIGN PATENT DOCUMENTS

| | | | | | |
|---|---|---|---|---|---|
| CN | 210397787 | U | | 4/2020 | |
| CN | 212029172 | U | | 11/2020 | |
| CN | 212839570 | U | | 3/2021 | |
| CN | 213065098 | U | | 4/2021 | |
| CN | 214467024 | U | | 10/2021 | |
| CN | 214838566 | U | | 11/2021 | |
| CN | 217207915 | U | | 8/2022 | |
| CN | 217819573 | U | | 11/2022 | |
| CN | 115683468 | A | | 2/2023 | |
| GB | 333357 | A | * | 8/1930 | ............... F16K 7/10 |
| JP | H0979392 | A | | 3/1997 | |
| JP | H1089584 | A | | 4/1998 | |
| KR | 960006187 | B1 | * | 5/1996 | ............... F16K 7/10 |

* cited by examiner

DEVICE FOR REAL-TIME DETECTION OF PIPELINE GAS LEAKAGE AND LEAKAGE PREVENTION, AND USE METHOD

BACKGROUND OF THE INVENTION

1. Field of the Invention

The present invention relates to the field of detection of pipeline gas leakage, and in particular to a device for real-time detection of pipeline gas leakage and leakage prevention and a use method.

2. The Prior Arts

Gas is generally a general term for gas fuels by the public, which can be divided into three categories: coal gas, liquefied petroleum gas, and natural gas. At present, gas appliances such as the coal gas, the liquefied petroleum gas, and the natural gas have been widely used in people's lives. Switches and ventilation pipelines of the gas appliances are prone to poor sealing or aging and cracking, causing gas leakage and posing a great threat to personal safety.

The Chinese patent with the publication No. CN115683468A discloses a gas leakage detection device for gas appliances, including a first detector and a second detector, where the first detector is mounted on a gas stove and can detect gas leakage in the gas stove, and the second detector is mounted in the gas stove and can detect gas leakage in a gas delivery pipe in the gas stove. When gas leakage occurs in the gas stove or the gas delivery pipe, it can be detected and an alarm can be issued immediately, and through design of an APP alarm module, gas leakage information can be transmitted to mobile phones.

The gas leakage detection device for gas appliances provided in the prior art can only play a monitoring and warning role in gas leakage. When there is no person indoors, prevention of continuous gas leakage in a short period of time cannot be realized, resulting in a large amount of gas waste and significant safety hazards. In addition, conventional gas cut-off devices are generally arranged at a main valve of the gas pipeline. Although the main valve can be cut off in case of gas leakage, gas stored in an end pipeline will continue to leak, posing a threat to personal safety.

SUMMARY OF THE INVENTION

The technical problem to be solved by the present invention is to provide a device for real-time detection of pipeline gas leakage and leakage prevention and a use method, in response to defects existing in the prior art, thereby achieving timely detection of gas leakage and segmented sealing of a gas pipeline.

In order to realize the objective, the present invention adopts the technical solution, the device for real-time detection of pipeline gas leakage and leakage prevention includes a gas pipeline, wherein a gas detector is arranged at an outer part of the gas pipeline, a telescopic cylinder is also electrically connected to an outer side of the gas detector, a plurality of three-way elliptical pipes are mounted at a middle segment part of the gas pipeline, flange connectors being abutted with the gas pipeline are fixedly arranged at two ends of each three-way elliptical pipe, a limiting cylinder is fixedly mounted at a bottom port of each three-way elliptical pipe, a separating mechanism is arranged between each limiting cylinder and the three-way elliptical pipe, and a pneumatic mechanism is arranged at a bottom of the limiting cylinder and is capable of triggering the separating mechanism to separate and seal the three-way elliptical pipe when being driven by the telescopic cylinder.

Further, the pneumatic mechanism includes a sleeve cover threadedly sleeving to a bottom of each limiting cylinder, a gas pipe fixedly communicates to a bottom of the sleeve cover, one end away from the sleeve cover of the gas pipe jointly and fixedly communicates with an output end of a communicator, a gas delivery pipe is fixedly mounted at an input end of the communicator, and a gas cylinder communicates with one end away from the communicator of the gas delivery pipe; and a piston block is embedded in the gas cylinder in a sliding manner, a first spring is arranged at one end close to the gas delivery pipe of the piston block, a push rod which penetrates through the gas cylinder in a sliding manner is fixedly mounted at one end away from the first spring, of the piston block, an another end of the push rod is fixedly connected with an output end of the telescopic cylinder, a first one-way gas valve of which a flowing direction is from an outer part of the gas cylinder to an inner part of the gas cylinder is arranged at one end close to the gas delivery pipe, of the gas cylinder through a connecting pipe, and a second one-way gas valve of which a flowing direction is from the gas delivery pipe to the communicator is arranged on the gas delivery pipe.

Further, the separating mechanism includes an airbag fixedly mounted at a center of the three-way elliptical pipe through bolts, a connecting pipe fixedly communicates with an opening in a bottom of the airbag, the airbag is capable of being inflated to expand and tightly fill a middle of the three-way elliptical pipe, an abutting cylinder is fixedly mounted on an inner wall of the limiting cylinder, and a top of the abutting cylinder fixedly communicates with a bottom of the connecting pipe.

Further, connecting lines between the airbag and the two flange connectors are vertically distributed, and the airbag is made of a silicone rubber material.

Further, a protection mechanism is arranged at a bottom of each abutting cylinder, and includes a cover plate fixedly mounted at a bottom of the abutting cylinder through screws, an extending cylinder which is embedded with an inner cylinder of the abutting cylinder in a sliding manner is fixedly mounted at an upper part of the cover plate, an inverted-conical bevel opening is formed between the extending cylinder and the cover plate, a plurality of through holes which are equidistantly distributed in a circumference are formed in a top of the extending cylinder, a positioning shaft is fixedly mounted at one end close to the inverted-conical bevel opening at a top of the extending cylinder, an elliptical sealing sphere sleeves an outer side of the positioning shaft, a sliding groove is formed in the elliptical sealing sphere, and a limiting disc which is embedded with the sliding groove in a sliding manner is fixedly mounted at a bottom of the positioning shaft: a second spring is arranged between an upper part of the elliptical sealing sphere and the extending cylinder, the elliptical sealing sphere is squeezed by the second spring, and an outer diameter of the elliptical sealing sphere is greater than a bottom diameter of the inverted-conical bevel opening, so that the elliptical sealing sphere realizes one-way sealing of a lower port of the inverted-conical bevel opening from top to bottom; and a prodding assembly is arranged at a bottom of the cover plate and is capable of clearing a lower port of the inverted-conical bevel opening from top to bottom by lifting the elliptical sealing sphere, and a communicating assembly which is capable of adjusting internal airtightness of the limiting cylinder is arranged between the prodding assembly and the limiting cylinder.

Further, a rubber coating is arranged at an outer part of the elliptical sealing sphere.

Further, the prodding assembly includes a damping rotating shaft fixedly embedded in the limiting cylinder, the damping rotating shaft is distributed below the cover plate, a rotating shaft part is arranged in the damping rotating shaft, a cam fixedly sleeves an outer surface of the rotating shaft part and is located directly below the elliptical sealing sphere, a knob is fixedly mounted at one end of the rotating shaft part, and an another end of the rotating shaft part is rotatably embedded in the limiting cylinder.

Further, the communicating assembly includes a blocking rotary table fixedly mounted at one end away from the knob of the rotating shaft part, the blocking rotary table is rotatably embedded in the limiting cylinder, a first air hole is formed in the limiting cylinder, a second air hole is formed in the blocking rotary table, an inner diameter of the first air hole is consistent with that of the second air hole, when the rotating shaft part drives the cam to rotate until a protruding part of the cam points directly upwards, the first air hole and the second air hole are abutted, and an internal space and an external space of the limiting cylinder are in communication.

Further, a triangular identification block is arranged at one end away from the limiting cylinder, of the knob, and a direction of the triangular identification block is consistent with that of a protruding part of the cam.

The present invention provides a use method of the device for real-time detection of pipeline gas leakage and leakage prevention. The method includes the following steps:

S1: a detection triggering stage: after detecting gas leakage, immediately triggering the telescopic cylinder through an electrical signal by the gas detector, thereby causing an output end of the telescopic cylinder to drive the piston block to move back and forth in the gas cylinder;

S2: an expansion and isolation stage: inflating the airbag through a one-way blocking effect of a first one-way gas valve and a second one-way gas valve on gas by the pneumatic mechanism during reciprocating motion of the piston block, and after being inflated, tightly filling a middle of the three-way elliptical pipe by the airbag, thereby achieving blocking and sealing of the three-way elliptical pipe; and S3: a deflation stage: after maintenance is completed, rotating the knob, driving the protruding part of the cam to point directly upwards by the damping rotating shaft and the rotating shaft part, lifting the elliptical sealing sphere upwards by the protruding part of the cam, so that a lower port of the inverted-conical bevel opening restores a dredging state from top to bottom, while a first air hole and a second air hole are abutted, forming a gas path by an inner part of the airbag and an outer part of the device, and under an action of pressure, shrinking the airbag due to air leakage, and unobstructing an inner part of the three-way elliptical pipe.

Compared with the prior art, the device for real-time detection of pipeline gas leakage and leakage prevention has the beneficial effects:

1. a plurality of three-way elliptical pipes are designed in a segmented manner in a middle position of the gas pipeline. When the gas detector detects gas leakage, an inner part of the three-way elliptical pipe is filled and sealed by inflation and expansion of the airbag in the three-way elliptical pipe, thereby achieving segmented sealing treatment of the gas pipeline, avoiding a large amount of leakage of combustible gas, and greatly reducing safety hazards; and 2. through the design of a protection mechanism, it is possible to avoid occurrence of airbag leakage due to incomplete sealing between the limiting cylinder and the sleeve cover, and improve stability of segmented sealing of the gas pipeline by the device.

REFERENCE NUMBERS IN FIGURES

1: gas pipeline: 2: three-way elliptical pipe: 3: flange connector: 4: limiting cylinder: 5: sleeve cover: 6: gas pipe: 7: communicator: 8: gas cylinder: 9: piston block: 10: first spring: 11: push rod: 12: gas delivery pipe: 13: first one-way gas valve: 14: second one-way gas valve: 15, connecting pipe: 16: airbag: 17: protection mechanism: 18: prodding assembly: 19: communicating assembly: 20: cover plate: 21: extending cylinder: 22: damping rotating shaft: 23: rotating shaft part: 24: cam: 25: knob: 26: triangular identification block: 27: through hole: 28: inverted-conical bevel opening: 29: positioning shaft: 30: elliptical sealing sphere: 31: second spring: 32: sliding groove: 33: limiting disc: 34: blocking rotary table: 35: first air hole: 36, second air hole; and 37: abutting cylinder.

DETAILED DESCRIPTION OF THE PREFERRED EMBODIMENT

In order to better explain the present invention and facilitate understanding, the following is a detailed description of the technical solution and effects of the present invention through specific implementation methods, combined with the accompanying drawings.

Figure 1:
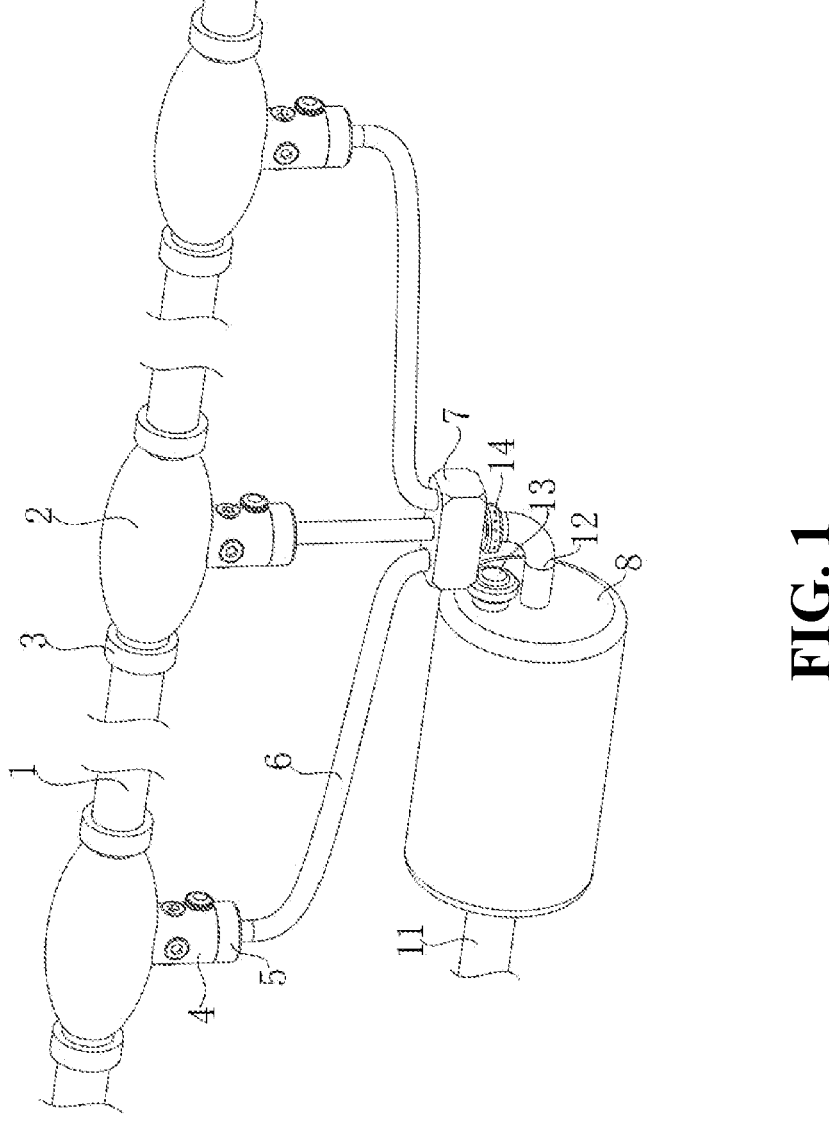
FIG. 1 is a schematic diagram of an overall structure of the present invention.

As shown in FIG. 1, a device for real-time detection of pipeline gas leakage and leakage prevention includes a gas pipeline 1, wherein a gas detector is arranged at an outer part of the gas pipeline 1, a telescopic cylinder (not shown) is also electrically connected to an outer side of the gas detector, a plurality of three-way elliptical pipes 2 are mounted at a middle segment part of the gas pipeline 1, flange connectors 3 being abutted with the gas pipeline 1 are fixedly arranged at two ends of each three-way elliptical pipe 2, a limiting cylinder 4 is fixedly mounted at a bottom port of each three-way elliptical pipe 2, a separating mechanism is arranged between each limiting cylinder 4 and the three-way elliptical pipe 2, and a pneumatic mechanism is arranged at a bottom of the limiting cylinder 4: after detecting gas leakage, the gas detector is capable of immediately triggering the telescopic cylinder through an electrical signal, and the pneumatic mechanism is capable of triggering the separating mechanism to separate and seal the three-way elliptical pipe 2 when being driven by the telescopic cylinder.

Figure 2:
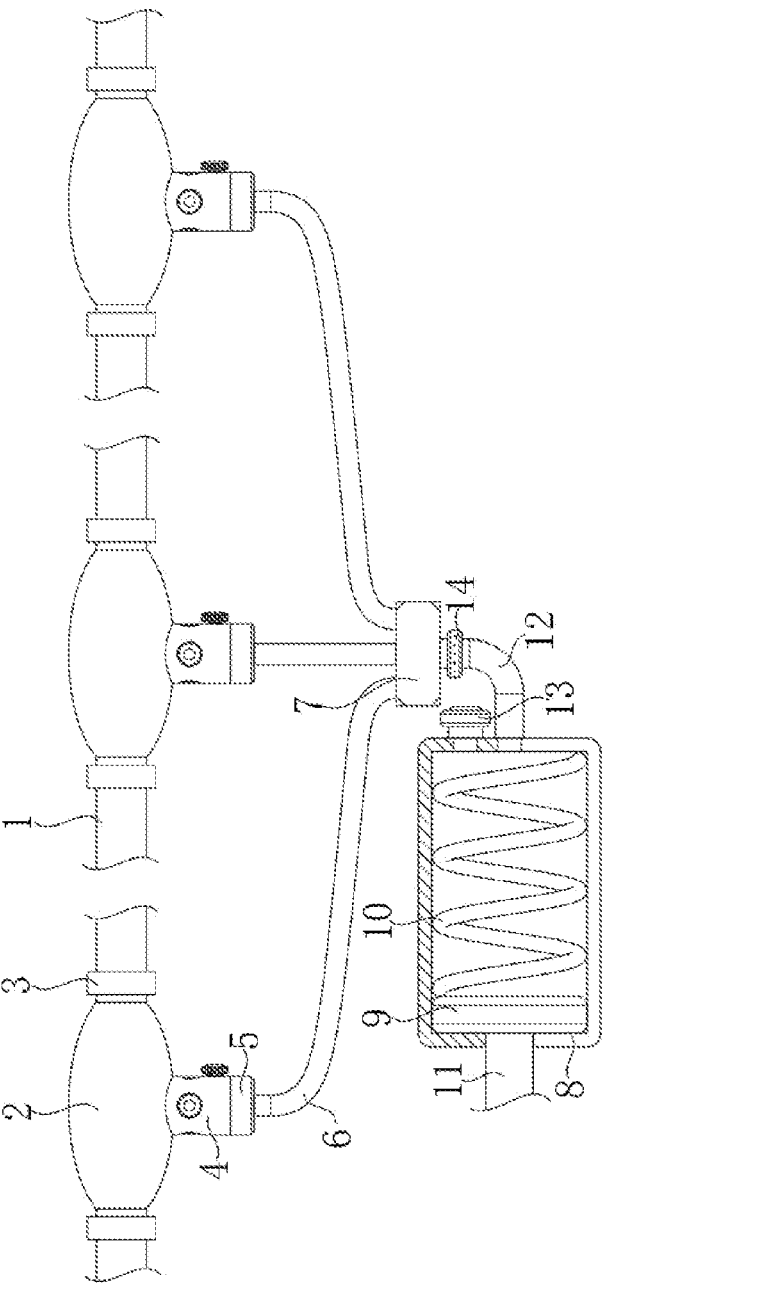
FIG. 2 is a front view of the present invention.

Further, as shown in FIG. 2, the pneumatic mechanism includes a sleeve cover 5 threadedly sleeving to a bottom of each limiting cylinder 4, a gas pipe 6 fixedly communicates to a bottom of the sleeve cover 5, one end away from the sleeve cover 5 of the gas pipe 6 jointly and fixedly communicates with an output end of a communicator 7, a gas delivery pipe 12 is fixedly mounted at an input end of the communicator 7, and a gas cylinder 8 communicates with one end away from the communicator 7 of the gas delivery pipe 12: a piston block 9 is embedded in the gas cylinder 8 in a sliding manner, a first spring 10 is arranged at one end close to the gas delivery pipe 12, of the piston block 9, a push rod 11 which penetrates through the gas cylinder 8 in a sliding manner is fixedly mounted at one end away from the first spring 10, of the piston block 9, an another end of the push rod 11 is fixedly connected with an output end of the telescopic cylinder, a first one-way gas valve 13 of which a flowing direction is from an outer part of the gas cylinder 8 to an inner part of the gas cylinder 8 is arranged at one end close to the gas delivery pipe 12 of the gas cylinder 8 through a connecting pipe, and a second one-way gas valve 14 of which a flowing direction is from the gas delivery pipe 12 to the communicator 7 is arranged on the gas delivery pipe 12. After receiving the electrical signal from the gas detector, the telescopic cylinder drives the piston block 9 to move back and forth in the gas cylinder 8. Through the one-way blocking effect of the first one-way gas valve 13 and the second one-way gas valve 14 on gas, air is continuously squeezed into the limiting cylinder 4 through the communicator 7 and the gas delivery pipe 12.

Figure 3:
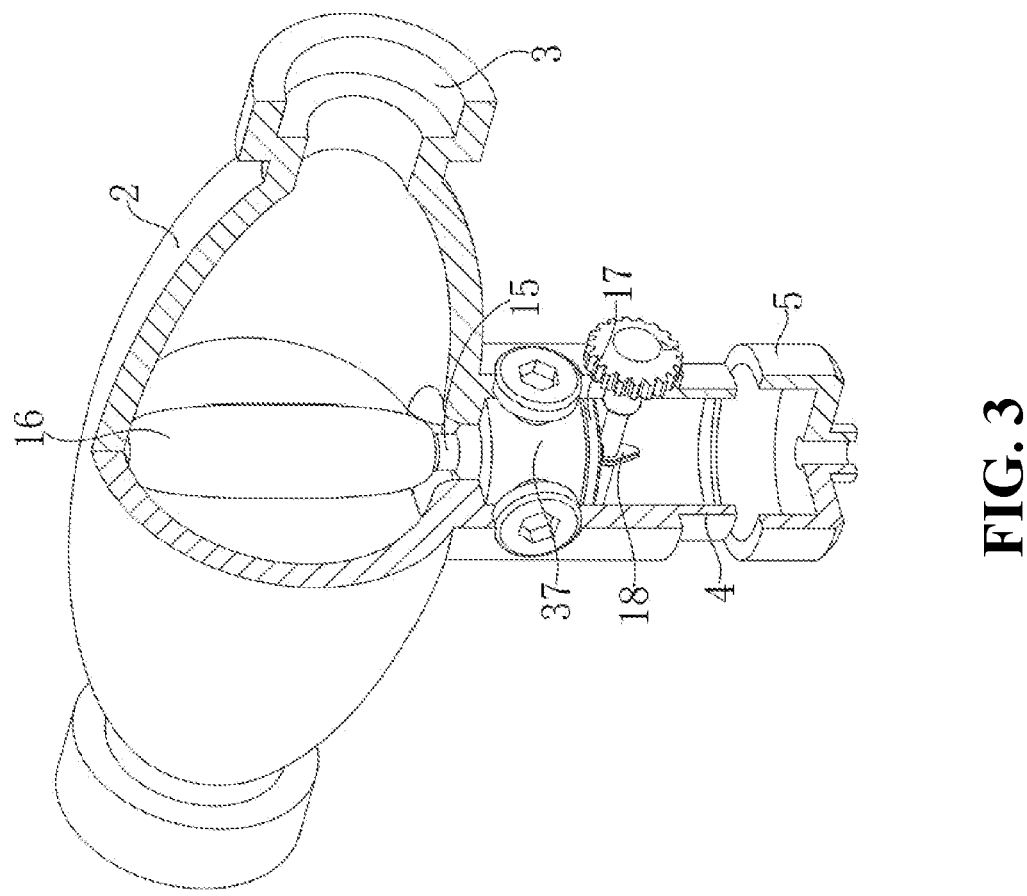
FIG. 3 is a schematic diagram of an internal structure of a three-way elliptical pipe and a limiting cylinder of the present invention.
Figure 4:
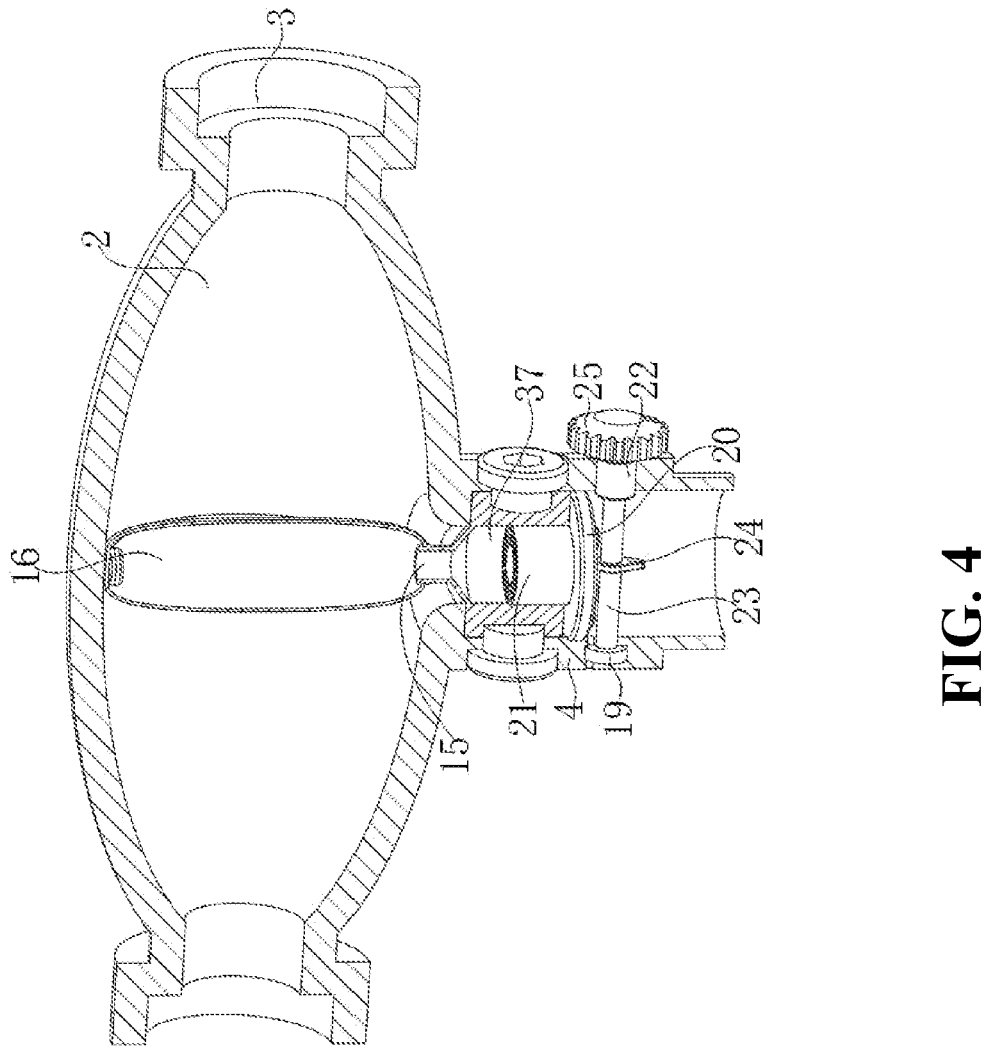
FIG. 4 is a schematic diagram of position distribution of an extending cylinder and an abutting cylinder of the present invention.

Further, as shown in FIG. 3 and FIG. 4, the separating mechanism includes an airbag 16 fixedly mounted at a center of the three-way elliptical pipe 2 through bolts, a connecting pipe 15 fixedly communicates with an opening in a bottom of the airbag 16, the airbag 16 is capable of being inflated to expand and tightly fill a middle of the three-way elliptical pipe 2, so as to block and seal the three-way elliptical pipe 2, an abutting cylinder 37 is fixedly mounted on an inner wall of the limiting cylinder 4, and a top of the abutting cylinder 37 fixedly communicates with a bottom of the connecting pipe 15.

Further, connecting lines between the airbag 16 and the two flange connectors 3 are vertically distributed, the structure can enable the airbag 16 to be more evenly squeezed towards an inner wall of the three-way elliptical pipe 2 during inflation and expansion, the airbag 16 is made of a silicone rubber material, and good elastic deformation performance of the silicone rubber material is used to achieve a better sealing effect.

Figure 5:
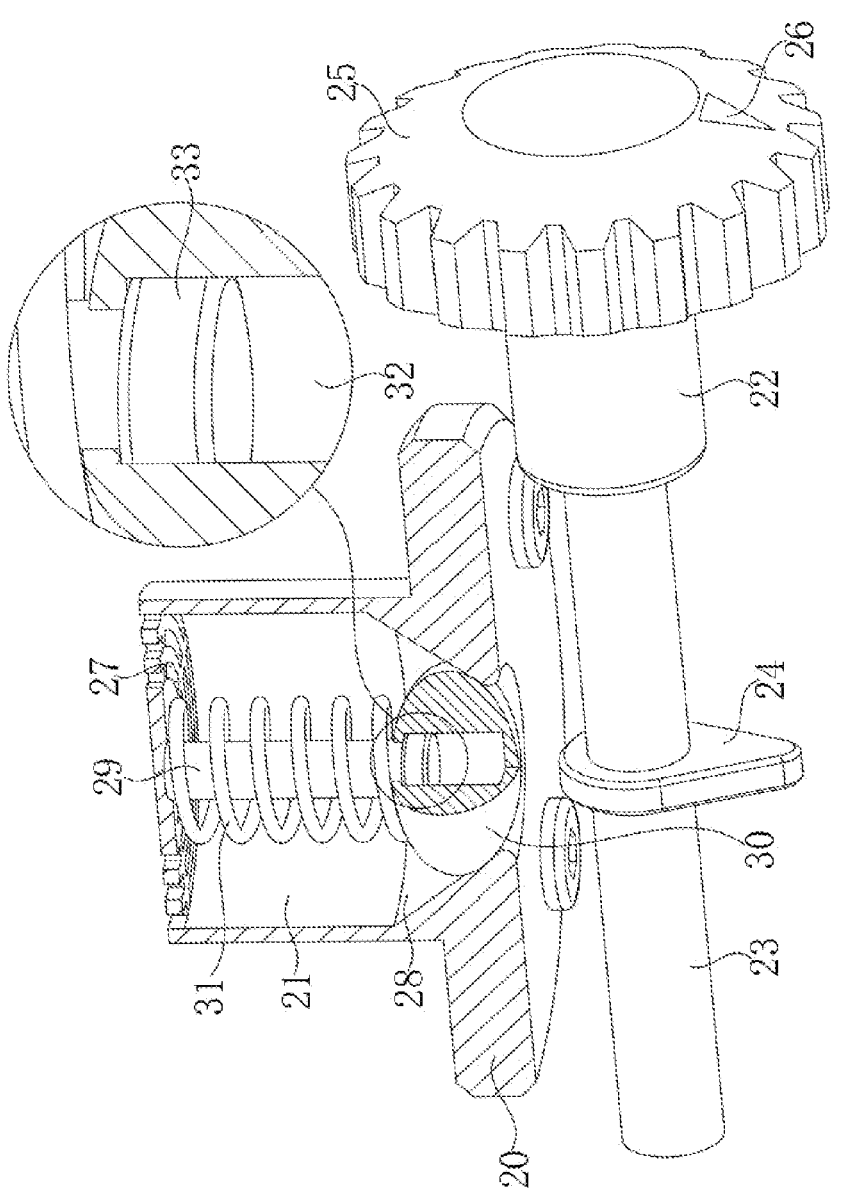
FIG. 5 is a schematic structural diagram of an internal structure of the extending cylinder and a prodding assembly of the present invention.

Further, as shown in FIG. 5, a protection mechanism 17 is arranged at a bottom of each abutting cylinder 37, and includes a cover plate 20 fixedly mounted at a bottom of the abutting cylinder 37 through screws, an extending cylinder 21 which is embedded with an inner cylinder of the abutting cylinder 37 in a sliding manner is fixedly mounted at an upper part of the cover plate 20, an inverted-conical bevel opening 28 is formed between the extending cylinder 21 and the cover plate 20, a plurality of through holes 27 which are equidistantly distributed in a circumference are formed in a top of the extending cylinder 21, a positioning shaft 29 is fixedly mounted at one end close to the inverted-conical bevel opening 28, at a top of the extending cylinder 21, an elliptical sealing sphere 30 sleeves an outer side of the positioning shaft 29, a sliding groove 32 is formed in the elliptical sealing sphere 30, and a limiting disc 33 which is embedded with the sliding groove 32 in a sliding manner is fixedly mounted at a bottom of the positioning shaft 29; a second spring 31 is arranged between an upper part of the elliptical sealing sphere 30 and the extending cylinder 21, and an outer diameter of the elliptical sealing sphere 30 is greater than a bottom diameter of the inverted-conical bevel opening 28: when air pressure above the inverted-conical bevel opening 28 is greater than the air pressure below, air pressure and elastic force of the second spring 31 tightly press the elliptical sealing sphere 30 onto the inverted-conical bevel opening 28; and when the air pressure above the inverted-conical bevel opening 28 is smaller than the air pressure below, and when an air pressure difference has greater pressure on the elliptical sealing sphere 30 than the elastic force of the second spring 31, the elliptical sealing sphere 30 is lifted by air flow upwards, thereby realizing one-way sealing of a lower port of the inverted-conical bevel opening 28 from top to bottom. A prodding assembly 18 is arranged at a bottom of the cover plate 20 and is capable of clearing a lower port of the inverted-conical bevel opening 28 from top to bottom by lifting the elliptical sealing sphere 30, and a communicating assembly 19 which is capable of adjusting internal airtightness of the limiting cylinder 4 is arranged between the prodding assembly 18 and the limiting cylinder 4.

Further, a rubber coating is arranged at an outer part of the elliptical sealing sphere 30, thereby achieving a good sealing effect.

Further, as shown in FIGS. 4 and 5, the prodding assembly 18 includes a damping rotating shaft 22 fixedly embedded in the limiting cylinder 4, the damping rotating shaft 22 is distributed below the cover plate 20, a rotating shaft part 23 is arranged in the damping rotating shaft 22, a cam 24 fixedly sleeves an outer surface of the rotating shaft part 23 and is located directly below the elliptical sealing sphere 30, a knob 25 is fixedly mounted at one end of the rotating shaft part 23, and an another end of the rotating shaft part 23 is rotatably embedded in the limiting cylinder 4.

Figure 6:
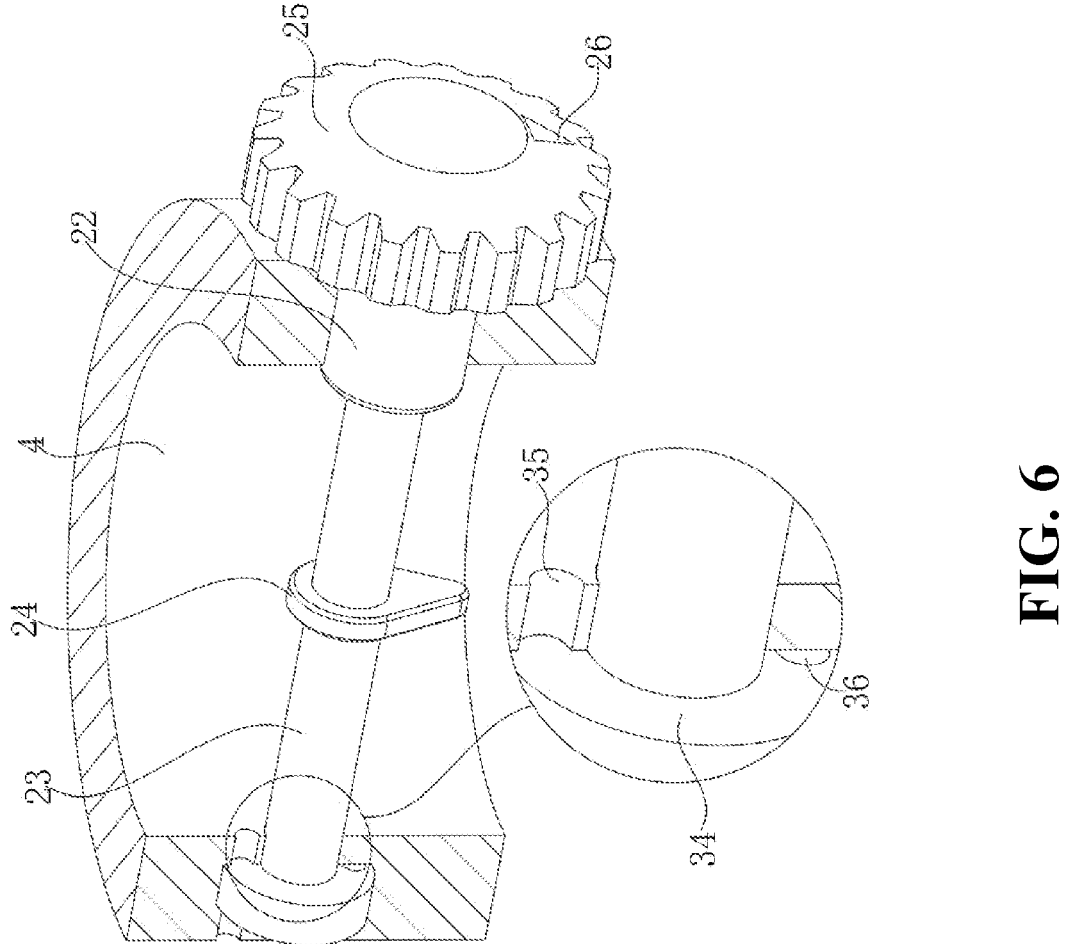
FIG. 6 is a schematic structural diagram of a communicating assembly of the present invention.

Further, as shown in FIG. 6, the communicating assembly 19 includes a blocking rotary table 34 fixedly mounted at one end away from the knob 25 of the rotating shaft part 23, the blocking rotary table 34 is rotatably embedded in the limiting cylinder 4, a first air hole 35 is formed in the limiting cylinder 4, a second air hole 36 is formed in the blocking rotary table 34, an inner diameter of the first air hole 35 is consistent with that of the second air hole 36, when the rotating shaft part 23 drives the cam 24 to rotate until a protruding part of the cam 24 points directly upwards, the first air hole 35 and the second air hole 36 are abutted, and an internal space and an external space of the limiting cylinder 4 are in communication.

Further, a triangular identification block 26 is arranged at one end away from the limiting cylinder 4 of the knob 25, and a direction of the triangular identification block 26 is consistent with that of the protruding part of the cam 24.

The present invention provides a use method of the device for real-time detection of pipeline gas leakage and leakage prevention. The method includes the following steps:

S1: a detection triggering stage: after detecting gas leakage, immediately triggering the telescopic cylinder through an electrical signal by the gas detector, thereby causing an output end of the telescopic cylinder to drive the piston block 9 to move back and forth in the gas cylinder 8.

S2: an expansion and isolation stage: inflating the airbag 16 through a one-way blocking effect of the first one-way gas valve 13 and the second one-way gas valve 14 on gas by the pneumatic mechanism during reciprocating motion of the piston block 9, and after being inflated, tightly filling a middle of the three-way elliptical pipe 2 by the airbag 16, thereby achieving blocking and sealing of the three-way elliptical pipe 2.

S3: a deflation stage: after maintenance is completed, rotating the knob 25, driving the protruding part of the cam 24 to point directly upwards by the damping rotating shaft 22 and the rotating shaft part 23, lifting the elliptical sealing sphere 30 upwards by the protruding part of the cam 24, so that a lower port of the inverted-conical bevel opening 28 restores a dredging state from top to bottom, while the first air hole 35 and the second air hole 36 are abutted, forming a gas path by an inner part of the airbag 16 and an outer part of the device, and under an action of pressure, shrinking the airbag 16 due to air leakage, and unobstructing an inner part of the three-way elliptical pipe 2.

Finally, it should be noted that the above specific implementation are only used to illustrate the technical solution of the present invention, without limitation thereto. Although the present invention has been described in detail with reference to the aforementioned embodiments, those skilled in the art should understand that it is still possible to modify the technical solution recorded in the aforementioned embodiments, or to equivalently replace some or all of the technical features thereof; and these modifications or replacements do not make the essence of the corresponding technical solution deviate from the scope limited by the claims of the present invention.

What is claimed is:

1. A device for real-time detection of pipeline gas leakage and leakage prevention, comprising a gas pipeline, wherein a gas detector is arranged at an outer part of the gas pipeline, a telescopic cylinder is also electrically connected to an outer side of the gas detector, a plurality of three-way elliptical pipes are mounted at a middle segment part of the gas pipeline, flange connectors being abutted with the gas pipeline are fixedly arranged at two ends of each three-way elliptical pipe, a limiting cylinder is fixedly mounted at a bottom port of each three-way elliptical pipe, a separating mechanism is arranged between each limiting cylinder and each three-way elliptical pipe, and a pneumatic mechanism is arranged at a bottom of the limiting cylinder and is capable of triggering each separating mechanism to separate and seal each three-way elliptical pipe when being driven by the telescopic cylinder;

wherein the pneumatic mechanism comprises a sleeve cover threadedly sleeving to a bottom of each limiting cylinder, a gas pipe fixedly communicates to a bottom of each sleeve cover, one end away from each sleeve cover of the gas pipe jointly and fixedly communicates with an output end of a communicator, a gas delivery pipe is fixedly mounted at an input end of the communicator, and a gas cylinder communicates with one end away from the communicator of the gas delivery pipe; a piston block is embedded in the gas cylinder in a sliding manner, a first spring is arranged at one end close to the gas delivery pipe of the piston block, a push rod which penetrates through the gas cylinder in a sliding manner is fixedly mounted at one end away from the first spring, of the piston block, an another end of the push rod is fixedly connected with an output end of the telescopic cylinder, a first one-way gas valve of which a flowing direction is from an outer part of the gas cylinder to an inner part of the gas cylinder is arranged at one end close to the gas delivery pipe of the gas cylinder through a connecting pipe, and a second one-way gas valve of which a flowing direction is from the gas delivery pipe to the communicator is arranged on the gas delivery pipe;

wherein each separating mechanism comprises an airbag fixedly mounted at a center of each three-way elliptical pipe through bolts, a connecting pipe fixedly communicates with an opening in a bottom of each airbag, each airbag is capable of being inflated to expand and tightly fill a middle of its respective three-way elliptical pipe, an abutting cylinder is fixedly mounted on an inner wall of each limiting cylinder, and a top of each abutting cylinder fixedly communicates with a bottom of each connecting pipe;

wherein a protection mechanism is arranged at a bottom of each abutting cylinder, and comprises a cover plate fixedly mounted at a bottom of each abutting cylinder through screws, an extending cylinder which is embedded with an inner cylinder of each abutting cylinder in a sliding manner is fixedly mounted at an upper part of each cover plate, an inverted-conical bevel opening is formed between each extending cylinder and each cover plate, a plurality of through holes which are equidistantly distributed in a circumference are formed in a top of each extending cylinder, a positioning shaft is fixedly mounted at one end close to each inverted-conical bevel opening at a top of each extending cylinder, an elliptical sealing member sleeves an outer side of each positioning shaft, a sliding groove is formed in the elliptical sealing member, and a limiting disc which is embedded with each sliding groove in a sliding manner is fixedly mounted at a bottom of each positioning shaft; a second spring is arranged between an upper part of each elliptical sealing member and each extending cylinder, each elliptical sealing member is squeezed by each second spring, and an outer diameter of each elliptical sealing member is greater than a bottom diameter of each inverted-conical bevel opening, so that each elliptical sealing member realizes one-way sealing of a lower port of each inverted-conical bevel opening from top to bottom; and a prodding assembly is arranged at a bottom of each cover plate and is capable of clearing a lower port of each inverted-conical bevel opening from top to bottom by lifting each elliptical sealing member, and a communicating assembly which is capable of adjusting internal airtightness of each limiting cylinder is arranged between each prodding assembly and each limiting cylinder;

wherein each prodding assembly comprises a damping rotating shaft fixedly embedded in each limiting cylinder, each damping rotating shaft is distributed below each cover plate, a rotating shaft part is arranged in each damping rotating shaft, a cam fixedly sleeves an outer surface of each rotating shaft part and is located directly below each elliptical sealing member, a knob is fixedly mounted at one end of each rotating shaft part, and another end of each rotating shaft part is rotatably embedded in each limiting cylinder;

wherein each communicating assembly comprises a blocking rotary table fixedly mounted at one end away from each knob of each rotating shaft part, each blocking rotary table is rotatably embedded in each limiting cylinder, a first air hole is formed in each limiting cylinder, a second air hole is formed in each blocking rotary table, wherein when each rotating shaft part drives each cam to rotate until a protruding part of each cam points directly upwards, each first air hole and each second air hole are abutted, and an internal space and an external space of each limiting cylinder are in communication.

2. The device for real-time detection of pipeline gas leakage and leakage prevention according to claim 1, wherein connecting lines between each airbag and each set of two flange connectors are vertically distributed, and each airbag is made of a silicone rubber material.

3. The device for real-time detection of pipeline gas leakage and leakage prevention according to claim 1, wherein a rubber coating is arranged at an outer part of each elliptical sealing member.

4. The device for real-time detection of pipeline gas leakage and leakage prevention according to claim 1, wherein a triangular identifier is arranged on each knob, and a direction of each triangular identifier is the same as that of a protruding part of each cam.

5. A use method of a device for real-time detection of pipeline gas leakage and leakage prevention, comprising the following steps:

S1: a detection triggering stage: after detecting gas leakage, immediately triggering a telescopic cylinder through an electrical signal by a gas detector, thereby causing an output end of the telescopic cylinder to drive a piston block to move back and forth in a gas cylinder;

S2: an expansion and isolation stage: inflating an airbag through a one-way blocking effect of a first one-way gas valve and a second one-way gas valve during reciprocating motion of the piston block, and after being inflated, tightly filling a middle of a three-way elliptical pipe by the airbag, thereby achieving blocking and sealing of the three-way elliptical pipe; and S3: a deflation stage: after maintenance is completed, rotating a knob, driving a protruding part of a cam to point directly upwards by a damping rotating shaft and a rotating shaft part, lifting an elliptical sealing member upwards by the protruding part of the cam, so that a first air hole and a second air hole are abutted, forming a gas path by an inner part of the airbag and an outer part of the device, and under an action of pressure, shrinking the airbag due to air leakage, and unobstructing an inner part of the three-way elliptical pipe.

* * * * *